US006773770B1

(12) United States Patent
Sugiyama et al.

(10) Patent No.: US 6,773,770 B1
(45) Date of Patent: Aug. 10, 2004

(54) INK JET RECORDING MATERIAL AND RECORDING METHOD

(75) Inventors: Naonobu Sugiyama, Ichikawa (JP); Kazuo Totani, Ichikawa (JP); Hiromasa Kondo, Urawa (JP)

(73) Assignee: OJI Paper Co., Ltd., Tokyo (JP)

( * ) Notice: Subject to any disclaimer, the term of this patent is extended or adjusted under 35 U.S.C. 154(b) by 0 days.

(21) Appl. No.: 09/342,052

(22) Filed: Jun. 29, 1999

(30) Foreign Application Priority Data

Jun. 30, 1998 (JP) .......................................... 10-184085

(51) Int. Cl.[7] .................................................. B32B 3/00

(52) U.S. Cl. ................ 428/32.34; 428/32.3; 428/32.37; 347/105

(58) Field of Search ................................. 428/195, 500, 428/323, 331, 32.3, 32.34, 32.37; 347/105

(56) References Cited

U.S. PATENT DOCUMENTS

| | | | | | |
|---|---|---|---|---|---|
| 4,613,525 | A | * | 9/1986 | Miyamoto et al. | 427/256 |
| 5,741,584 | A | * | 4/1998 | Imabeppu et al. | 428/329 |
| 5,958,579 | A | * | 9/1999 | Idei et al. | 428/342 |
| 6,165,606 | A | * | 12/2000 | Kasahara et al. | 428/323 |
| 6,383,611 | B1 | * | 5/2002 | Kohno et al. | 428/195 |
| 2002/0071941 | A1 | * | 6/2002 | Tsuchida et al. | 428/195 |

FOREIGN PATENT DOCUMENTS

| | | | | |
|---|---|---|---|---|
| EP | 0672539 A1 | | 9/1995 | |
| EP | 0818322 A1 | | 1/1998 | |
| EP | 818322 | * | 1/1998 | B41M/5/00 |
| EP | 0844098 | * | 5/1998 | B41M/5/00 |
| JP | 55-5183 | | 1/1980 | |
| JP | 55-66976 | | 5/1980 | |
| JP | 56-148585 | | 11/1981 | |
| JP | 9-132740 | | 5/1997 | |
| JP | 9-157559 | | 6/1997 | |
| JP | 9-188062 | | 7/1997 | |

* cited by examiner

*Primary Examiner*—B. Shewareged
(74) *Attorney, Agent, or Firm*—Arent Fox PLLC

(57) ABSTRACT

An ink jet recording material appropriate to ink recording, preferably pigment ink recording, has an ink receiving layer formed on a support and including a pigment containing amorphous silica, alumina and/or alumino silicate, a binder, and a cationic resin having a cation equivalent of 1.5 to 6 milli equivalent/g, as determined by a colloid titration method.

6 Claims, No Drawings

INK JET RECORDING MATERIAL AND RECORDING METHOD

BACKGROUND OF THE INVENTION

1. Field of the Invention

The present invention relates to an ink jet recording material for recording thereon picture and letter images, and a recording method using the recording material. More particularly, the present invention relates to an ink jet recording material capable of recording thereon ink images having a high clarity by using a coloring pigment-containing ink with no or very little blotting of the ink, and a recording method using the recording material.

2. Description of the Related Art

With the progress of ink jet color printers in producing colored hard copies at a high speed, it has become possible to provide high dignity ink images having high clarity and color density. However, to further enhance the dignity, chroma and appearance of the prints and the quality of the images, the recording material is required to exhibit further improved recording properties. Particularly, in response to the increases in printing speed, resolving power, and chroma of the images, the recording material has been required to exhibit other improved properties, such as an enhanced ink-drying property, an ink absorbing capacity, a dot-size-contrlling property and an ink blotting-preventing property. To respond to the requirements, various types of recording sheets have been developed. For example, Japanese Unexamined Patent Publications No. 55-5183 and No. 56-148,585 disclose an ink jet recording sheet having an ink recording layer formed on a substrate sheet and containing a porous inorganic pigment, to enhance the ink absorption by the ink receiving layer. On one hand, currently, the use of the ink jet printer is expanded, in addition to letter-printing use for making books, to large width poster-printing use for advertisements.

The ink jet printer is very easy to operate and is suitable for printing use in a small amount and thus is distinguished from another printers using printing plates. Therefore, the ink jet printer can produce prints, having necessary images and by a quick operation, in a necessary amount. In the printing for advertisement, a plotter, which can print in a large width, is usually used. The plotter must be able to print ink images for advertisement use with such a high clarity that the printed images can be clearly seen even from far away. Also, the printed images must be able to keep the images in a high-clarity condition over a long period of display. However the conventional ink for the ink jet printing is a dye ink which is oxidized under ultraviolet ray-irradiation or by ozone, and thus the dye ink images are faded and advertisement display is digraded. To solve the above-mentioned disadvantages, it has been attempted by Japanese Unexamined Patent Publications No. 9-157,559 and No. 9-132,740 to replace the dye ink by a coloring pigment ink having a higher light fastness than that of the dye ink. However, it should be noted that there is a difference in the coloring mechanism between the dye ink and the pigment ink, because the coloration by the dye ink is effected by dying the ink receiving layer with a low molecular dye compound, while the coloration by the pigment ink is carried out by spreading or placing pigment particles over and in the ink receiving layer surface, and thus the necessary properties for the dye ink-recording material are different from those for the pigment ink-recording material. Also, the molecular weight of the pigment is significantly larger than that of the dye, and the color fixing mechanism of the pigment to control the blotting of the ink is quite different from the reaction mechanism of the low molecular dye with the ink receiving layer, and thus the conventional ink jet recording material for the dye ink is not appropriate to the pigment ink and cannot record thereon pigment images having a satisfactory color density and a sufficient blot-resistance.

When the ink jet recording material is used as a label having an adhesive layer formed on the backside of the recording material and a release sheet attached to the adhesive layer, the ink images recorded on the label are required to exhibit a high stability over a long time of storage, and thus the ink jet recording material for the label must have a high applicability to the pigment ink printing.

The conventional pigment ink printing system is disadvantageous in that the recorded pigment ink images have an unsatisfactory color density in comparison with that of disperse dye-dyed images, and when the pigment ink is applied in an increased amount to the ink receiving layer, to enhance the color density of the printed ink images, the resultant ink images exhibit a poor color fastness to rubbing and thus when rubbed, the pigment images easily become lighter and the non-printed portions of the recording surface are stained by the pigment. Also, the pigment images have a poor color fastness to water and thus, when wetted with water, the wetted pigment images are easily blotted. The above-mentioned disadvantages are due to the fact that the printed pigment ink is not fully fixed to the recording material. Therefore, the ink jet recording material suitable to the disperse dye ink-printing system cannot solve the above-mentioned problems.

For the disperse dye ink-printing system, there are various attempts to enhance the water resistance of the dye ink images. For example, in Japanese Unexamined Patent Publication No. 9-188,062, a water resistance-enhancing agent is applied to the dye-ink receiving surface before and after the dye ink images are recorded thereon. In Japanese Unexamined Patent Publication No. 55-66,976, the water resistance of the disperse dye images is enhanced by using, as a solvent for the ink, a volatile organic solvent and jetting imagewise the resultant dye ink toward the recording surface. However, in the system in which the water-resistance-enhancing agent is applied, the printing mechanism becomes complicated and unless the liquid absorption capacity of the ink receiving layer is fully increased, a bleeding phenomenon, in which the ink images are blotted, occurs.

Further, in the system using the water resistance-enhancing agent, a maintenance not only for the ink but also for the water resistance-enhancing agent is necessary and thus the printing cost increases.

When the ink jet recording material is used for the label on which the recorded images are absolutely necessary to exhibit a high storage stability, there is a strong demand of applying a pigment ink to the label. When the pigment ink is used, the pigment ink images applied to a surface of the recording material must be immediately fixed to the recording surface. In a conventional fixing mechanism, the pigment particles are anionically dispersed in a ink medium, and a cationic component is contained in the ink receiving layer, to agglomerate the anionically dispersed pigment particles with the cationic component. When the dye ink in which the dye is usually anionic is used, a large amount of the cationic component must be contained in the ink receiving layer. However, when the pigment ink is used, and the cationic component is contained in too large an amount in the ink receiving layer, the pigment particles are rapidly agglomerated at the surface of the ink receiving layer and thus the ink cannot be uniformly distributed in the images, and a feathering phenomenon occurs to reduce the color density of the ink images. Therefore, the conventional ink jet recording material suitable for the dye ink printing system cannot record thereon pigment ink images having a high quality.

SUMMARY OF THE INVENTION

An object of the present invention is to provide an ink jet recording material for recording thereon high dignity ink images containing a coloring pigment and having a high color density, by an ink jet recording system, for example, an ink jet recording printer or plotter, at a high printing speed, without blotting the ink images, and an ink jet recording method using the recording materials.

Another object of the present invention is to provide an ink jet recording material capable of recording thereon pigment-containing ink images, having a high clarity and an excellent weathering resistance, and useful for industrial use in which the printed ink images must exhibit a high color density, a high water resistance, and a high color fastness to rubbing, and the recording material must have a high pigment ink-fixing performance, and an ink jet recording method using the recording material.

The above-mentioned objects can be attained by the ink jet recording material and the ink jet recording method of the present invention.

The ink jet recording material of the present invention for recording thereon ink images containing a coloring material, comprises a support; and an ink receiving layer formed on the support, and comprising a pigment comprising at least one member selected from the group consisting of an amorphous silica, alumina and alumino silicate and a binder, the ink receiving layer further comprising a cationic resin having a cation equivalent of 1.5 to 6 milli equivalent/g, determined by a colloid titration method.

In the ink jet recording material of the present invention, the cation equivalent of the cationic resin is preferably in the range of from 1.5 to 5 milli equivalent/g, more preferably from 2 to 4 milli equivalent/g.

In the ink jet recording material of the present invention, the cationic resin preferably comprises at least one selected from polyethylene imines, polyvinylpyridines, poly-dialkylaminoethyl methacrylates, poly-dialkylaminoethyl acrylates, poly-dialkylaminoethyl methacrylamides, poly-dialkylaminoethyl acrylamides, polyepoxyamines, polyamideamines, dicyandiamide-formaldehyde condensation products, dicyandiamidepolyalkyl-polyalkylenepolyamine condensation products, polymers of diallyldimethyl ammonium salts, polyvinylamines, polyallylamines polyallylamine salts, polyvinylamine salts, poly (oxyethyl-1-methylene)amine salts, polyvinylbenzylamine salts, polyacrylamido-propylmethylamine salts, polydiallylamine salts, acrylamide-diallylamine salt copolymers, monoallylamine-diallylamine salt copolymers and polyaminedicyan polymers, more preferably polydiallyldimethyl ammonium salts.

In the ink jet recording material of the present invention, the cationic resin preferably has a weight average molecular weight of 30,000 or less.

In the ink jet recording material of the present invention, the pigment for the ink receiving layer preferably comprises amorphous silica.

In the ink jet recording material of the present invention, the pigment for the ink receiving layer is preferably in the form of particles having an average particle size of 4 to 15 $\mu$m.

In an embodiment of the ink jet recording material of the present invention, the cationic resin has a cation equivalent of 2 to 4 milli equivalent/g and is present together with an additional cationic resin having a cation equivalent of 4.5 to 8 milli equivalent/g and the pigment.

The pigment usable for the embodiment preferably has an oil absorption of 70 ml/100 g or more.

In the ink jet recording material of the present invention, the coloring material for the ink images is preferably a coloring pigment.

The method of the present invention for ink jet recording on the ink jet recording material of the present invention, as defined above comprises jetting imagewise ink droplets containing a coloring pigment toward a surface of the ink jet recording material.

DESCRIPTION OF THE PREFERRED EMBODIMENTS

The ink jet recording method using an aqueous pigment ink is referred to as a recording method in which an ink containing a coloring material, preferably a coloring pigment, and an aqueous or non-aqueous medium is jetted in the form of small droplets toward an ink receiving layer of an ink jet recording material to form pigment ink images thereon, in the same manner as for a conventional aqueous dye ink. Thus, the quality of the recorded ink images is greatly influenced by the ink-absorbing property of the ink jet recording material. Generally, the larger the amount of the ink receiving layer, the higher the ink absorption of the ink receiving layer. However, the increase in the amount of the ink receiving layer causes the amount of the coloring pigment of the ink absorbed within the inside of the ink receiving layer to increase and thus the color density of the visible ink images to decrease.

To solve the above-mentioned problem, when the amount of the ink receiving layer is decreased so as to cause the coloring pigment of the ink to locate mainly in the surface portion of the ink receiving layer, the blotting of the ink images is promoted, and further since the ink medium cannot be fully absorbed by the ink receiving layer, the non-absorbed ink medium moves together with the coloring pigment, and thus, the distribution of the coloring pigment in the ink images located in the surface portion of the ink receiving layer, becomes ununiform, and in the ink-printed portions, inkless spots are formed and the color density of the ink images is reduced.

In the ink containing a dye, since the dye molecules are very small, the dye can be bonded with the ink receiving layer to form colored images while the dye moves together with the ink medium. In this case, when the ink receiving layer has a low ink-absorption capacity, the recorded dye ink images tend to exhibit an increased color density. However, it was confirmed that the above-mentioned phenomenon does not occur when the pigment ink is used in place of the dye ink. Namely, the coloring mechanism of the pigment ink is quite different from that of the dye ink. In the ink jet recording method using the pigment ink, the color density of the ink images can be enhanced by uniformly arranging or placing the coloring pigment particles in the surface portion of the ink receiving layer. The pigment ink jet recording material must be able to uniformly receive, at the surface portion thereof, the coloring pigment component of the pigment ink and to quickly absorb in the inner portion of thereof the ink medium component.

The inventors of the present invention have made an extensive research on the pigment ink-receiving property and pigment ink-absorbing property of the ink-receiving layer in the ink jet recording system. As a result, it was found that the colored image-forming property of the pigment ink and the resistance of the colored ink images to blotting can be improved by containing a specific cationic resin in the ink receiving layer. The present invention was completed based on the finding.

In the ink receiving layer of the ink jet recording material of the present invention, the cationic resin having a cation equivalent of 1.5 to 6 milli equivalent/g, more preferably 1.5 to 5.5 milli equivalent/g, more preferably 1.5 to 5.0 milli equivalent/g, still more preferably 2 to 4 milli equivalent/g, further preferably 2.5 to 4.0 milli equivalent/g, determined by a colloid titration method, is contained, to enhance the colored image-forming property and the resistance of the pigment ink images to blotting.

The colloid titration method is referred to as a titration method utilizing an ion-association reaction between colloidal particles. Namely, an ionic polymer having a known molecular structure is dissolved in water to prepare a normal solution having a fixed ion concentration, and an ion amount of a sample of a target polymer having an ionic property opposite to that of the known ionic polymer is measured in the units of equivalent/g, namely, an ion amount in the units of equivalent of the target polymer sample per g of the target polymer sample, on the basis of the normal solution. This colloid titration method is disclosed in SENJU, "COLLOID TITRATION METHOD" published on Nov. 20, 1996, by NANKODO. In this titration method, by using an anionic polymer-containing normal solution, the cation equivalent of a cationic resin can be determined.

The reasons for the fact that, in the ink jet recording procedure using a pigment ink, the ink jet recording material having an ink receiving layer containing a cationic resin which has a cation equivalent of 1.5 to 6.0 milli equivalent/g, determined by a colloid titration method can record thereon pigment ink images having an excellent colored image-forming property and a superior resistance to blotting, has not yet been made completely clear. However, the reasons are assumed to be as follows.

In the aqueous ink, to uniformly disperse the pigment particles in an ink liquid medium, an ionic structure is imparted to the coloring pigment molecules. Usually, anionic groups, for example, carboxylate groups are attached to the pigment molecules, and thus the anionic pigment particles can be ionically combined with a cationic substance. When the cationic substance is a polymeric material, a molecule of the polymeric cationic material may be bonded with a plurality of the anionic pigment particles to form an agglomerate. It is assumed that the higher the cation equivalent of the polymeric cationic material, the easier the agglomeration of the polymeric cationic material with an anionic material, for example, the anionic pigment particles. The cationic resin used in the conventional ink jet recording material has a high cation equivalent. In the case where the cationic resin having a cation equivalent more than 6 milli equivalent/g is contained in an ink receiving layer, when pigment ink droplets jetted toward the ink receiving layer come into contact with the ink receiving layer, the pigment particles in the droplets are immediately bonded and agglomerated with the cationic resin it the ink receiving layer, and thus, it is assumed that the coloring pigment particles cannot be evenly distributed in the ink images applied onto the ink receiving layer, to cause local inkless white spots to be formed in the ink images and the resultant ink images to exhibit a reduced color density.

On the other hand, when a cationic resin having a cation equivalent of less than 1.5 milli equivalent/g is used, substantially no agglomeration of the cationic resin with the anionic coloring pigment particles occurs, and thus it is assumed that the ink receiving layer containing the cationic resin cannot fix the anionic coloring pigment particles on or in the surface portion of the ink receiving layer, and the applied ink images exhibit a poor resistance to blotting of the ink.

The cationic resin usable for the ink receiving layer of the present invention preferably contains at least one member selected from, for example, polyethylene-imines, polyvinylpyridines, poly-dialkylaminoethyl methacrylates, poly-dialkylaminoethyl acrylates, poly-dialkylaminoethyl methacrylamides, poly-dialkylaminoethyl acrylamides, polyepoxyamines, polyamidepolyamines, dicyandiamide-formaldehyde condensation products, dicyandiamidepolyalkyl-polyalkylenepolyamine condensation products, polymers of diallyldimethyl ammonium salts, for example, polymers of diallyldimethyl ammonium chloride salt, polyvinylamines, polyallylamines, polyallylamine salts, polyvinylamine salts, poly(oxyethyl-1-methylene) amine salts, polyvinylbenzylamine salts, polyacrylamidopropylmethylamine salts, polydiallylamine salts, acrylamide-diallylamine salt copolymers, monoallylamine-diallylamine salt copolymers and polyaminedicyan polymers, and modification products of the above mentioned compounds.

In the ink jet recording material of the present invention, an ink receiving layer having an excellent film strength can be obtained by using a poly-diallyldimethyl ammonium salts such as poly-diallyldimethyl ammonium chloride salt.

When the ink jet recording material is used in a use in which the printed ink images are required to have a high resistance to rubbing and a high stability in storage, the ink receiving layer preferably contains a cationic resin having a weight average molecular weight of 30,000 or less. By controlling the weight average molecular weight of the cationic resin to 30,000 or less, the ink images recorded in the resultant ink receiving layer may exhibit a high color density and an excellent resistance to rubbing.

For this purpose, the weight molecular weight of the cationic resin is more preferably 25,000 or less, still more preferably 21,000 or less, further more preferably 20,000 or less. There is no specific lower limit to the molecular weight of the cationic resin. Preferably, the weight average molecular weight of the cationic resin is 1,000 or more, more preferably 2,000 or more. The reasons for the fact that the cationic resin having a weight average molecular weight in a specific range contributes to enhancing the rubbing resistance of the ink images, have not yet been made completely clear, it is assumed that when the coloring pigment particles contained in the pigment ink droplets applied to the ink receiving layer are agglomerated to too high an extent on the surface of the ink receiving layer, a plurality of inkless spots are formed between the pigment particle agglomerates to reduce the color density of the ink images as a whole; since the amount of the coloring pigment particles penetrated into the inside of the ink receiving layer is reduced, the amount of the pigment particles left on the ink receiving layer surface become large and the resultant pigment images exhibit a reduced resistance to rubbing; and as a result, when the pigment images are rubbed, the rubbed pigment images are erased. Also, it is assumed that the molecular weight of the cationic resin influences on the agglomeration of the anionic pigment particles.

When the content of the cationic resin in the ink receiving layer is too low, the resultant ink receiving layer may cause the pigment ink images formed thereon to exhibit an unsatisfactory water resistance and an insufficient resistance to rubbing. Also, when the cationic resin content is too high, the resultant ink receiving layer may cause the pigment ink images formed thereon to exhibit a reduced color density and an insufficient resistance to rubbing, and may exhibit a reduced ink absorption, and thus a bleeding phenomenon, namely a blotting of the ink images, may occur.

In the ink receiving layer of the present invention, the content of the cation resin is preferably 0.5 to 100 parts by weight, more preferably 5 to 80 parts by weight, still more preferably 10 to 50 parts by weight, per 100 parts by weight of the pigment contained in the ink receiving layer. When the cationic resin content is less than 0.5 parts by weight, the ink images received on the resultant ink-receiving layer may be blotted. Also, if the cationic resin content is more than 100 parts by weight, the ink-drying property of the resultant ink receiving layer may be reduced, while the color density of the recorded ink images may increase.

The pigment usable for the ink receiving layer of the present invention is preferably selected from amorphous silica, alumina and alumina silicate, particularly amorphous silica. The amorphous silica can be produced by a method in which a high purity siliceous sand is mixed with sodium silicate and sulfuric acid to produce a silicic acid sol and then a three dimensional agglomerate is formed from the silisic acid sol; another method in which the growth of secondary aggregates of the silica particles is stopped by controlling the reaction temperature and the content of ions or by adding a surfactant to cause the resultant amorphous silica particles to precipitate; or a still another method in which silicon tetrachloride is decomposed to produce amorphous silica particles. By containing the amorphous silica particles, the resultant ink receiving layer of the ink jet recording material exhibits an enhanced ink absorption.

The pigment particles contained in the ink receiving layer of the present invention preferably have an average particle size of 1 to 20 μm, more preferably 4 to 15 μm, still more preferably 6 to 15 μm. When the average size in the range of 1 to 20 μm, the ink images recorded on the resultant ink receiving layer can exhibit a satisfactory color density. When the average size of the pigment particles is 1 μm or more, the resultant ink, receiving layer can allow the ink dots formed on the ink receiving layer to have a satisfactory size for causing the resultant ink images to be formed with a high color density.

However, when the average size of the pigment, particles is more than 20 μm, the resultant ink receiving layer may have a rough surface and thus a degraded appearance.

To provide an ink receiving layer having a satisfactory ink absorption, the pigment particles, for example, the amorphous silica particles, preferably have an oil absorption of 70 ml/100 g or more, more preferably 180 ml/100 g or more, still more preferably 250 ml/100 g or more, further more preferably 270 ml/g or more. There is no upper limit to the oil absorption of the amorphous silica particles. Generally, the amorphous silica particles having an oil absorption of about 400 ml/g or less are available. When the oil absorption is too high, the resultant amorphous silica particles may exhibit a low dispersibility and cause the resultant coating liquid for the ink receiving layer containing the amorphous silica particles to exhibit too high a viscosity. When the amorphous silica particles having the above-mentioned high oil absorption are contained in the ink receiving layer, preferably a cationic resin having a cation equivalent of 4.5 to 8.0 milli equivalent/g is contained, in an amount at which the effect of the present invention is not affected, in the ink receiving layer to improve the dispersibility of the amorphous silica particles. There is no limitation to the content of the cationic resin. Usually, the cationic resin having a cation equivalent of 4.5 to 8.0 milli equivalent/g is preferably contained in an amount of 0.5 to 10 parts by weight per 100 parts by weight of the amorphous silica particles.

As long as the resistance to blotting and the color density of the recorded ink images are not affected, and the objects of the present invention can be attained, the ink receiving layer may contain therein an additional pigment in addition to the specific pigment of the present invention, to improve the coating property of the coating liquid for the ink receiving layer. The additional pigment usable for the ink receiving layer of the present invention preferably comprises at least one member selected from inorganic pigments, for example, colloidal silica, calcium carbonate, clay, calcined clay, diatomaceous earth, talc, aluminum oxide, magnesium aluminosilicate, magnesium carbonate, barium sulfate, zinc oxide, aluminum hydroxide, magnesium hydroxide and zeolites; and organic pigments, for example, urea-formaldehide resin fillers, and acrylonitrile polymer plastic pigments. These additional pigment materials may be employed alone or in a mixture of two or more thereof.

The binder usable for the ink receiving layer of the present invention preferably comprises at least one member selected from water-soluble polymers, for example, polyvinyl alcohols, polyvinyl alcohol derivatives, for example, silyl-modified polyvinyl alcohols and cation-modified polyvinyl alcohols, proteins, for example, gelatin and casein, starch, starch derivatives, for example, oxidized starches, polyvinyl pyrrolidone, and cellulose derivatives, for example, hydroxyethylcellulose, hydroxypropylcellulose, hydroxypropylmethylcellulose and carboxymethyl cellulose; and water-insoluble polymeric materials, for example, latices of conjugated diene polymers, for example, styrene-butadiene copolymers and methyl methacrylate-butadiene copolymers, latices of acrylic polymers, for example, homopolymers and copolymers of acrylate esters and methacrylate esters, and latices of polymers of vinyl monomers, for example, vinyl acetate.

The binder materials as mentioned above may be employed alone or in a mixture of two or more thereof.

The binder contained in the ink receiving layer of the present invention is preferably present in an amount of 10 to 100 parts by weight, more preferably 15 to 80 parts by weight, per 100 parts by weight of the pigment. When the amount of the binder is less than 10 parts by weight, the resultant ink receiving layer may exhibit an insufficient film-forming property and thus an unsatisfactory mechanical strength. Also, when the amount of the binder is more than 100 parts by weight, the high content of the binder in the ink receiving layer causes the amount of ink-absorbing capillaries distributed throughout the ink receiving layer to be reduced, and the resultant ink receiving layer to exhibit an unsatisfactory ink-drying property.

The ink receiving layer of the present invention optionally contains an additive comprising at least one member selected from pigment-dispersing agents, anti-foaming agents, viscosity-regulating agent, cross-linking agents, fluorescent dyes, coloring materials, anti-oxidants, and ultra-violet ray-absorbing agents, in consideration of the production conditions and desired properties of the ink receiving layer.

The support for the ink jet recording material of the present invention is formed from at least one member selected from paper sheets, for example, acid paper sheets, neutral paper sheets, coated paper sheet and cast-coated paper sheets, plastic resin films (including paper sheets laminated at one or more surfaces thereof with a plastic resin), synthetic paper sheets (including those produced by drawing an undrawn film of a mixture of a thermoplastic resin with a filler, for example, an inorganic pigment to convert the undrawn film to a drawn film having a plurality of voids and thus a paper-like appearance and hand), transparent, semi-transparent and white plastic films, fabrics including nonwoven fabrics and fabric composites and metal foils. The above-mentioned sheets, films, fabrics, and foils may be employed in a combination of two or more thereof. Also, the support optionally has an adhesive layer formed on a back surface thereof and/or can be decorated by printing or sticking.

When the support comprises a paper sheet, the pulp for the paper sheet may be selected from ground pulps, sulfite pulps, kraft pulps, semi-chemical pulps, chemi-ground pulps, refiner-ground pulps produced from, as a principal component, softwoods, for example, Japanese red pine, Japanese black pine, silver fir, fir and Japanese cedar, and hardwoods, for example, Japanese beech, birch and chinquapin, and waste paper pulps.

When the support comprises a paper sheet, the paper sheet optionally comprises, in addition to the pulp, as main components, a pigment including inorganic pigments, for example, clay, talc, calcium carbonate, calcined kaolin, aluminum oxide, aluminum hydroxide and titanium dioxide, and organic pigments, for example, urea resin; and/or an additional comprising at least one member selected from, for example, internally added sizing agents, for example, rosin, alkylketene dimer and alkenyl succinate, sizing agents, fixing agents, for example, aluminum sulfate and cationic starches, and paper strength-enhancing agents, for example, polyacrylamide polymers and starch. These additive agents are mixed into a pulp slurry. The mixed pulp slurry is subjected to a paper-forming procedure using a paper machine.

Optionally, at least one surface of the paper sheet for the support is size-treated with a surface-sizing agent which may be selected from rosin-sizing agents, petroleum resins, starch and starch derivatives, for example, oxidized starches, acetylated starches and hydroxyethylated starches, polyvinyl alcohols and derivatives thereof, polymers of one of and copolymers of two or more of styrene, acrylate esters, olefins, maleic acid and vinyl acetate, alkid resins and polyamides which polymers are employed in the state of an aqueous emulsion or dispersion, and wax-sizing agents. Also, to control the thickness of the support, a conventional surface-pressing treatment using, for example, a machine calendar or a super calendar may be applied to the paper sheet for the support.

The plastic resin films for the support for the present invention may be formed from thermoplastic resins such as polyester resins and polyolefin resins. The polyester resins include polyethylene terephthalate resins, polylbutylene terephthalate resins and polycyclohexane terephthalate resins and the polyolefin resins include polyethylene, polypropylene, ethylene-propylene copolymer, and ethylene-vinyl acetate copolymer resins and resinous mixtures of two or more thereof.

The above-mentioned film-forming resins may be used alone or in a mixture of two or more of the resins or at least one of the resins may be used together with at least one additional resin, selected from, for example, polystyrene and acrylate ester copolymers.

The thermoplastic films may be ones formed from the resin and orientated in a longitudinal and/or a transverse direction of the films.

The films for the support may be paper-like films produced by forming a blend of a thermoplastic resin with an inorganic fine particles into undrawn films and by orientating the undrawn films in at least one directions, preferably biaxially. Also, in the present invention, two or more films may be laminated on one another to form a multi-layered support. The support may be a two or three-layered film laminate having front and/or back paper-like surface layer, or a 3 to 5 layered film laminate having a front-and/or back surface-coated layer formed on the front and/or back paper-like surface layer.

The multi-layered thermoplastic film sheet having at least one paper-like layer is referred to as a synthetic paper sheet. There is no limitation to the opaqueness of the synthetic paper sheet for the support.

The method for forming the ink receiving layer on the support is not limited to a specific method. The ink receiving layer can be formed by a conventional coater, for example, bar coater, air knife coater, blade coater, die coater, curtain coater, gravure coater or a lip coater.

In the ink jet recording material of the present invention, the ink receiving layer is preferably formed in an amount of 3 to 40 $g/m^2$, more preferably 8 to 30 $g/m^2$. The coating amount of the ink receiving layer is established in consideration of the use of the resultant recording material and is not necessary to be large as long as the resultant ink receiving layer exhibits a satisfactory ink absorption, colored image-formation and a coating film strength. When the coating amount of the ink receiving layer is less than 3 $g/m^2$, the resultant ink receiving layer may exhibit an insufficient ink absorption capacity, an unsatisfactory resistance of the ink images to blotting, a low ink drying rate which may cause parts, for example a sheet-delivery roll, of the printer to be stained by the non-dried ink. Also, when the coating amount is more than 40 $g/m^2$, the resultant ink recording layer may exhibit a low mechanical strength and may be partially peeled off so as to block the ink jetting nozzle, and an economical disadvantage may occur due to the high cost of the thick ink receiving layer.

The ink receiving layer of the present invention may have a single layered structure or a two or more-layered structure. For the purpose of enhancing the adhesion of the ink receiving layer to the support, a corona discharge treatment may be applied to a surface of the support and/or an anchor coat is formed between the support and the ink receiving layer. To form the ink receiving layer, two or more coating layers may be formed by two or more coating procedures, or a coating layer is formed on a casting surface and then transferred to a surface of a support or a surface of a coating layer formed on the support, to provide the ink receiving layer.

After an ink receiving layer is formed on a support, the resultant composite may be used as an ink jet recording material without applying a processing thereto. Otherwise the resultant composite may be surface-smoothed by, for example, a super calendar or gloss calendar, to enhance the gloss of the ink receiving layer.

The ink jet recording material of the present invention is optionally provided with a self-adhesive layer formed on a back surface of the recording material. Also, the ink recording material of the present invention may be a two surface-recordable ink jet recording sheet produced from a pair of ink jet recording materials which are adhered to each other at the back surfaces of the supports thereof. Further, after printed, the printed ink receiving layer may be laminated with a protecting film, which must be transparent, to protect the printed ink images.

The ink jet recording material of the present invention can be recorded thereon with a coloring pigment-containing recording ink by an ink jet recording method. Also, the ink jet recording material of the present invention can be recorded with a dye-containing ink. The pigment ink is prepared by dispersing coloring organic and/or inorganic pigment particles in an aqueous medium or an organic medium containing, for example, water and/or isopropyl alcohol in the presence of a dispersing agent.

The organic coloring pigments include azo, phthalocyanin pigments, Berlin pigments, isoindolinone pigments, imidazolone pigments, pyranthrone pigments, and thioindigo pigments, and the inorganic pigments include, for example, carbon black, graphite, synthetic iron oxide yellow, transparent blood red, titanium yellow, molybdenum orange, copper suboxide, cobalt blue, ultramarine, CI Pigment Yellow (yellow ink), CI Pigment Blue (Cyan ink), CI Pigment Red (Magenta ink).

The dispersing agents for the pigment inks include various types of surfactants, low molecular weight dispersing agents, and polymeric dispersing agent having hydrophilic groups and hydrophobic groups. The pigment inks may contain an aqueous resin to regulate the viscosity of the ink.

In the preparation of the pigment ink, a pigment is mixed together with a dispersing agent into a liquid medium, the mixture is subjected to a pigment particle-pulverizing procedure using a paint shaker or sand mill, and then the resultant mixture is filtered through a filter having a filter hole size of 1.0 μm or less, to remove coarse particles, to provide a pigment ink. There is no limitation to the content of the pigment in the ink. Usually, the content of the pigment in the pigment ink is 0.5 to 30% by weight.

EXAMPLES

The present invention will be further explained by the following examples which are merely representative and are not intended to restrict the scope of the present invention in any way.

Example I-1

An aqueous pulp slurry was prepared from 100 parts by weight of a wood pulp (LBKP, Canadian Standard Freeness: 500 ml), 10 parts by weight of calcined kaolin (trademark: Ansilex, made by Engelhard Mineral Co.), 0.05 part by weight of a sizing agent, 1.5 parts by weight of aluminum sulfate, 0.5 part of a wet paper strengthening agent and 0.75 part by weight of starch, and was subjected to a paper-forming procedure using a long wire paper machine to produce a woodfree paper sheet having a basis weight of 80 $g/m^2$. The woodfree paper sheet had a Stöckigt sizing degree of 6 seconds. In each of the following examples and comparative examples, the same woodfree paper sheet as mentioned above was employed as a support sheet.

In Example I-1, a front surface of the woodfree paper sheet was coated with a coating liquid-1 having the composition shown below and dried to form an ink receiving layer having a dry weight of 8 $g/m^2$. An ink jet recording sheet was obtained.

Coating Liquid-1

| Component | Part by weight |
|---|---|
| Amorphous silica pigment having an average particle size of 4.3 μm and an oil absorption of 260 ml/100 g (trademark: FINESIL X-45, made by TOKUYAMA K. K.) | 100 |
| Cationic resin having a cation equivalent of 2.9 milli equivalent/g, and comprising dicyandiamide-polyethyleneamine (trademark: NEOFIX, made by NIKKA KAGAKU K. K.) | 20 |
| Binder comprising a completely saponified polyvinyl alcohol (trademark: PVA 117, made by KURARAY K. K.) | 60 |

Example I-2

The same woodfree paper sheet as in Example I-1 was coated at the front surface thereof with a coating liquid-2 having the composition shown below and dried to form an ink receiving layer having a dry weight of 25 $g/m^2$. An ink jet recording sheet was obtained.

Coating Liquid-2

| Component | Part by weight |
|---|---|
| Amorphous silica pigment having an average particle size of 12 μm and an oil absorption of 180 ml/100 g (trademark: SILICIA470, made by FUJI SILICIA K. K.) | 100 |
| Cationic resin having a cation equivalent of 3.4 milli equivalent/g, and comprising dicyandiamide-formaldehyde (made by NIKKA KAGAKU K. K.) | 50 |
| Binder comprising an incompletely saponified polyvinyl alcohol (trademark: PVA 420, made by KURARAY K. K.) | 30 |

Example I-3

The same woodfree paper sheet as in Example I-1 was coated at the front surface thereof with a coating liquid-3 having the composition shown below and dried to form an ink receiving layer having a dry weight of 15 $g/m^2$. An ink jet recording sheet was obtained.

Coating Liquid-3

| Component | Part by weight |
|---|---|
| Amorphous silica pigment ① having an average particle size of 4.3 μm (trademark: FINESIL X-45, made by TOKUYAMA K. K.) | 50 |
| Amorphous silica pigment ② having an average particle size of 12 μm (trademark: SILICIA470, made by FUJI SILICA K. K.) | 50 |
| Cationic resin having a cation equivalent of 3.5 milli equivalent/g and a molecular weight of 4,000 and comprising diallyldimethyl ammonium chloride salt (trademark: UNISENCE CP-91, made by SENCA K. K.) | 35 |
| Silanol-modified polyvinyl alcohol (trademark: R-1130, made by KURARAY K. K.) | 40 |
| Vinyl acetate-ethylene copolymer latex (trademark: SUMICAFLEX S-473, made by SUMITOMO KAGAKU KOGYO K. K.) | 5 |

In the mixture of the amorphous silica pigments ① and ②, the average particle size was 8.2 μm.

Example I-4

A synthetic paper sheet (trademark: YUPO FPG-110, made by OJI YUKAGOSEISHI K.K.) comprising a polypropylene resin and an inorganic pigment and having a three-layered laminate structure, in which a core base layer is interposed between front and back paper-like layers, and a thickness of 110 μm was employed as a support sheet.

A surface of the support sheet was coated with the same coating liquid-3 as in Example I-3 and dried to form an ink receiving layer having a dry weight of 15 $g/m^2$. An ink jet recording sheet was obtained.

Example I-5

An ink jet recording sheet was produced by the same procedures as in Example I-1, except that in the coating liquid-1, the amorphous silica pigment (FINESIL X-45) was replaced by another amorphous silica pigment having an average particle size of 18 μm and an oil absorption of 250 ml/100 g (trademark: NIPSIL ES, made by NIPPON SILICA KOGYO K.K.).

Comparative Example I-1

An ink jet recording sheet was produced by the same procedures as in Example I-1, except that the cation resin (NEOFIX) of Example I-1 was replaced by another cation resin comprising a polyallylamine chloride salt and having a cation equivalent of 9.2 milli equivalent/g and a molecular weight of 80,000 (trademark: PAA-HCL-10L, made by NITTO BOSEKI, K.K.).

Comparative Example I-2

An ink jet recording sheet was produced by the same procedures as in Example I-2, except that the cation resin (dicyandiamide-formaldehyde) of Example I-2 was replaced by another cation resin comprising a diallyldimethyl ammonium chloride salt and having a cation equivalent of 6.2 milli equivalent/g and a molecular weight of 100,000 (trademark: UNISENCE CP-103, made by SENCK, K.K.).

Comparative Example I-3

An ink jet recording sheet was produced by the same procedures as in Example I-3, except that the cation resin (UNISENCE CP-91) of Example I-3 was replaced by another cation resin comprising a cation-modified polyvinyl alcohol and having a cation equivalent of 0.5 milli equivalent/g (trademark: CM-318, made by KURARAY, K.K.).

Comparative Example I-4

An ink jet recording sheet was produced by the same procedures as in Example I-1, except that the amorphous silica pigment (FINESIL X-45) of Example I-1 was replaced by a precipitated calcium carbonate pigment having an average particle size of 1.6 μm (trademark: TAMAPEARL TP-121, made by OKUTAMA KOGYO K.K.).

Measurement of Cation Equivalent

The cation equivalent of the cationic resin used in each of the examples and comparative examples was determined by the following measurement.

An aqueous solution of a cationic resin having a concentration of 0.4 g/liter in an amount of 10 ml was mixed with 2 drops of a Toluidine Blue indicator, and was titrated with a N/400 aqueous potassium polyvinyl sulfate (PVSK). The titration amount was determined when the color of the cationic resin solution was changed from a blue color to a reddish purple color. The cation equivalent of the cation resin was determined from the titration amount in accordance with the following equation.

$$\text{Cation equivalent (milli equivalent/g)}=\{[1/400 \text{ (equivalent/liter)}\times \text{PVSK titration amount (ml)}\times\text{PVSK factor}]/[0.4 \text{ (g/liter)}\times 10 \text{ (ml)}]\}\times 1000$$

The PVSK factor was 1.108.

The measurement results are shown in Table 1.

Tests and Evaluations

Each of the ink jet recording sheets of the above-mentioned examples and comparative examples were subjected to the following tests.

(1) Color Density of Printed Ink Images

A sample of the ink jet recording sheet was printed by an ink jet plottor (NOVA JET PRO, ink: GO ink, made by ENCAD Co.,) with each of a black-coloring ink, a yellow-coloring ink, a magenta-coloring ink and a cyan-coloring ink. The color density of the images of each coloring ink was organoleptically evaluated.

The black-coloring ink comprised a black-coloring pigment comprising of a carbon black and a liquid medium consisting of 81.8% of water and 18.2% of diethyleneglycol. The magenta-coloring ink comprised a pigment consisting of quinacridone magenta (CI Pigment Red 122 and a liquid medium consisting of 84.7% of water and 15.3% of diethyleneglycol. The cyan and yellow-coloring inks contained a cyan-coloring pigment and a yellow-coloring pigment, respectively. The color densities of the printed ink images formed from each of the black, yellow, magenta and cyan coloring inks were organoleptically evaluated, by the naked eye, into the following four classes.

| Class | Color density |
|---|---|
| 4 | Excellent |
| 3 | Practically sufficient |
| 2 | Slightly insufficient for practice |
| 1 | Insufficient for practice |

(2) Resistance of Ink Images to Blotting

On each sample, cyan-coloring ink (100%) images and magenta-coloring ink (100%) images were superposed on each other by using the ink jet plotter (VOVA JET PRO, ink: GO ink, made by ENCAD CO.). The resistance of the images formed by the superposed cyan-coloring ink (100%) and magenta-coloring ink (100%) to blotting was organoleptically evaluated by the naked eye, into the following four classes.

| Class | Blotting resistance |
|---|---|
| 4 | No blotting of the superposed ink images is found. Excellent |
| 3 | Slight blotting of the superposed ink images is found. Usable in practice |
| 2 | Blotting resistance is slightly insufficient for practice. |
| 1 | Blotting resistance is low. Not usable in practice |

(3) Peeling Strength of Ink Receiving Layer

An adhesive tape was adhered on and peeled off from the surface of each ink receiving layer of the recording sheet. As an adhesive tape, a cellophane tape (made by NICHIBAN) was used.

The resistance of the ink receiving layer to peeling off was organoleptically evaluated into the following four classes.

| Class | Peeling off resistance |
|---|---|
| 4 | Peeling off resistance is very high. |
| 3 | Peeling off resistance is sufficient for practice. |
| 2 | Peeling off resistance is slightly insufficient for practice. |
| 2 | Peeling off resistance is insufficient for practice. |

(4) Appearance

The appearance of each ink receiving layer was organoleptically evaluated by the naked eye, into the following four classes.

| Class | Appearance of ink receiving layer |
|---|---|
| 4 | The ink receiving layer surface is very smooth and the appearance is very good |
| 3 | The ink receiving layer surface is smooth and the appearance is good. |
| 2 | The surface smoothness of the ink receiving layer is slightly insufficient for practice. |
| 1 | The surface of the ink receiving layer is very coarse and the appearance is unsatisfactory for practice. |

The test results are shown in Table 1.

TABLE 1

| Example No. | | Cationic resin: Type | Cationic resin: Cation equivalent (milli equi/g) | Average particle size of silica (μm) | Color density of ink images | Resistance of images to blotting | Resistance of ink receiving layer to peeling off | Appearance |
|---|---|---|---|---|---|---|---|---|
| Example | I-1 | Dicyandiamide-polyethyleneamine | 2.9 | 4.3 | 3 | 3 | 3 | 4 |
| | I-2 | Dicyandiamide-formaldehyde | 3.4 | 12.0 | 4 | 4 | 3 | 4 |
| | I-3 | Diallyldimethyl ammonium chloride salt | 3.5 | 8.2 | 4 | 4 | 4 | 4 |
| | I-4 | Diallyldimethyl ammonium chloride salt | 3.5 | 8.2 | 4 | 4 | 4 | 4 |
| | I-5 | Dicyandiamide-polyethyleneamine | 2.9 | 18.0 | 4 | 4 | 4 | 3 |
| Comparative Example | I-1 | Polyallylamine chloride salt | 9.2 | 4.3 | 1 | 4 | 3 | 4 |
| | I-2 | Diallyldimethyl ammonium chloride salt | 6.2 | 12.0 | 2 | 4 | 4 | 4 |
| | I-3 | Cation-modified polyvinyl alcohol | 0.5 | 8.2 | 1 | 1 | 3 | 4 |
| | I-4 | Dicyandiamide-polyethyleneamine | 2.9 | 1.6 ($CaCO_3$) | 1 | 1 | 3 | 4 |

Table 1 clearly shows that the ink jet recording sheets of the examples were excellent in the color density of the pigment ink images, the resistance of the ink images to blotting and the resistance of the ink receiving layer to peeling off. Compared with them, the ink jet recording sheets of the comparative examples were unsatisfactory in the color density of the pigment ink images, the resistance of the ink images to blotting and the resistance of the ink receiving layer to peeling off.

It was confirmed that the ink jet recording sheets of the present invention were excellent in the color density of the ink images and the resistance of the ink receiving layer to peeling off when a pigment ink printing is applied thereto.

Example II-1

As a support sheet, a paper sheet (trademark: MARSHMALLOW, made by OJI PAPER CO., LTD.) made from a wood pulp with a high whiteness, having a high surface smoothness and a basis weight of 105 g/$m^2$, was employed. A front surface of the support paper sheet was coated with an aqueous coating dispersion having the coating liquid-4 shown below and a total solid content of 20% by weight and dried to form an ink receiving layer having a dry weight of 15 g/$m^2$.

Coating liquid-4 (total solid content: 20% by weight)

| Component | Part by weight |
|---|---|
| Cationic resin: 30% aqueous polydiallyldimethyl ammonium chloride salt solution (trademark: UNISENCE CP101, made by SENCK K. K.), having a weight average molecular weight of 20,000 and a cation equivalent of 5.0 milli equivalent/g | 65 |
| Amorphous silica pigment having an average particle size of 4.3 μm (trademark: FINESIL X-45, made by TOKUYAMA K. K.) | 100 |
| 10% aqueous solution of polyvinyl alcohol (trademark: PVA 105, made by KURARAY K. K.) | 200 |
| Water | |

Example II-2

An ink jet recording sheet was produced by the same procedures as in Example II-1, except that the coating liquid 4 of Example II-1 was replaced by an aqueous coating liquid 5 having the composition shown below and a total solid content of 20% by weight.

Coating liquid-5 (total solid content: 20% by weight)

| Component | Part by weight |
|---|---|
| Cationic resin: 30% aqueous polydiallyldimethyl ammonium chloride salt solution (trademark: UNISENCE CP90, made by SENCK K. K.), having a weight average molecular weight of 4,000, and a cation equivalent of 3.5 milli equivalent/g | 65 |
| Amorphous silica pigment (trademark: FINESIL X-45, made by TOKUYAMA K. K.) | 100 |
| 10% aqueous solution of polyvinyl alcohol (trademark: PVA 105, made by KURARAY K. K.) | 200 |
| Water | |

Comparative Example II-1

The same support paper sheet as in Example II-1 was coated at the front surface thereof with an aqueous coating liquid-6 having the composition shown below and dried to form an ink receiving layer having a dry weight of 15 g/m$^2$. An ink jet recording sheet was obtained.

Coating liquid-6 (total solid content: 20% by weight)

| Component | Part by weight |
|---|---|
| Cationic resin: 30% aqueous polydiallyldimethyl ammonium chloride salt solution (trademark: UNISENCE CP103, made by SENCK K. K.), having a weight average molecular weight of 100,000, and a cation equivalent of 6.2 milli equivalent/g | 65 |
| Amorphous silica pigment (trademark: FINESIL X-45, made by TOKUYAMA K. K.) | 100 |
| 10% aqueous solution of polyvinyl alcohol (trademark: PVA 105, made by KURARAY K. K.) | 200 |
| Water | |

Tests

Each of the ink jet recording sheets of Examples II-1 and II-2 and Comparative Example II-1 was printed by using NOVA JET plotter made by ENCAD CO. using GO inks (pigment inks) in a cyan color with a cyan coloring ink (100%), in a yellow color with an yellow coloring ink (100%), in a magenta color with a magenta coloring ink (100%) and in red color with yellow and magenta coloring inks (200%) superposed one each other, each to form a solid image. The printed amount of the superposed yellow and magenta coloring inks was twice the printed amount of each of the yellow, cyan and magenta coloring inks.

(1) Color Density

The color density of each solid colored image was determined by using a Macbeth color density meter (model: RD-914, made by Macbeth Co.). For each color of the solid images, an appropriate filter was employed.

(2) Ink Absorption

Immediately after the printing, the resultant ink images were brought into contact with a finger, to determine the ink absorption of the ink jet recording sheet. The tested ink absorption was classified in the following three classes.

| Class | Ink absorption |
|---|---|
| 3 | Ink is fully absorbed and recorded ink images have no tacky feel. |
| 2 | Recorded ink images are readable in practice, and have a slight tacky feel. |
| 1 | Recorded ink images have a significant tacky feel and are unsatisfactory for practice. |

(3) Resistance of Ink Images to Rubbing

Recorded ink images on a recording sheet was fully dried for one day, and the dried ink images were rubbed with a finger. A reduction in color density of the rubbed ink images and an adhesion of the ink from the ink images to the finger were observed and evaluated by the naked eye in the following three classes.

| Class | Resistance to rubbing |
|---|---|
| 3 | No color density reduction is found, and no ink adheres to finger. |
| 2 | Slight rubbing traces are found and no ink adheres to finger. |
| 1 | Significant rubbing traces are found and thus the ink images are unsatisfactory for practice. |

(4) Resistance of Ink Images to Blotting

Immediate after printing, the blotting of each, of the images of each single coloring ink the superposed different two coloring inks was observed and evaluated by the naked eye in the following 4 classes.

| Class | Blotting resistance |
|---|---|
| 4 | Substantially no blotting of ink is found. |
| 3 | A slight blotting of ink is found. |
| 2 | A certain blotting of ink is found. |
| 1 | A significant blotting of ink is found and the resultant ink images are unsatisfactory in practice. |

The test results are shown in Table 2.

TABLE 2

| | Item | | | | | | | | |
|---|---|---|---|---|---|---|---|---|---|
| | Color density of ink images | | | | Ink absorption | | Resistance of ink images to rubbing | | Resistance of ink images to blotting |
| Example No. | Cyan | Magenta | Yellow | Red | Cyan | Red | Cyan | Red | Yellow/red |
| Example II-1 | 1.25 | 1.23 | 1.30 | 1.17 | 2 | 2 | 3 | 3 | 4 |
| Example II-2 | 1.26 | 1.24 | 1.30 | 1.17 | 2 | 2 | 3 | 3 | 4 |
| Comparative Example II-1 | 1.05 | 1.12 | 1.22 | 1.09 | 3 | 3 | 2 | 2 | 1 |

Table 2 shows that the ink jet recording sheets of the present invention exhibited excellent color density, clarity and stability in storage of the ink images and superior resistances of the ink images to rubbing and to blotting, even when pigment inks were employed.

The ink jet recording materials of the present invention are appropriate to recording thereon images of pigment inks with a high color density of the ink images, and superior resistances of the ink images to rubbing and blotting, and are valuable in practice.

What is claimed is:

1. An ink jet recording material for recording thereon ink images containing a coloring pigment, comprising:

a support comprising a synthetic paper sheet; and an ink receiving layer formed on the support and comprising an amorphous silica pigment, a binder; and a cationic polymer of diallydimethyl ammonium chloride salt having a cation equivalent of 1.5 to 6 milli equivalent/g, determined by a colloid titration method, the amorphous silica pigment for the ink receiving layer being in the form of a mixture of two types of particles different in average particle size from each other and having an average particle size of the two different types of particles of 4 to 15 μm.

2. The ink jet recording material as claimed in claim 1, wherein the cation equivalent of the cationic resin is in the range of from 1.5 to 5 milli equivalent/g.

3. The ink jet recording material as claimed in claim 2, wherein the cation equivalent of the cationic resin is in the range of from 2 to 4 milli equivalent/g.

4. The ink jet recording material as claimed in claim 1, wherein the cationic resin has a weight average molecular weight of 30,000 or less.

5. The ink jet recording material as claimed in claim 1, wherein the pigment has an oil absorption of 70 ml/100 g or more.

6. A method of ink jet recording on the ink jet recording material as claimed in any of claims 1 to 5, comprising jetting imagewise ink droplets containing a colored pigment toward a surface of the ink jet recording material.

* * * * *